(12) United States Patent
Sugiyama et al.

(10) Patent No.: US 7,140,800 B2
(45) Date of Patent: Nov. 28, 2006

(54) JOINT STRUCTURE FOR POWER TRANSMITTING MEMBER AND METHOD FOR PRODUCING THE SAME

(75) Inventors: Kenichi Sugiyama, Kanagawa (JP); Katsuro Kawahara, Kanagawa (JP)

(73) Assignee: Hitachi, Ltd., Tokyo-to (JP)

( * ) Notice: Subject to any disclaimer, the term of this patent is extended or adjusted under 35 U.S.C. 154(b) by 0 days.

(21) Appl. No.: 10/237,932

(22) Filed: Sep. 10, 2002

(65) Prior Publication Data

US 2003/0068194 A1 Apr. 10, 2003

(30) Foreign Application Priority Data

Sep. 10, 2001 (JP) .............................. 2001-273320

(51) Int. Cl.
*F16C 3/00* (2006.01)
(52) U.S. Cl. .................... 403/266; 403/359.1; 464/181
(58) Field of Classification Search ................ 403/266, 403/359.1, 359.2, 359.5, 359.6; 464/134, 464/182, 181, 183
See application file for complete search history.

(56) References Cited

U.S. PATENT DOCUMENTS

| | | | | |
|---|---|---|---|---|
| 3,847,694 A | | 11/1974 | Stewing | |
| 4,041,599 A | * | 8/1977 | Smith | 29/451 |
| 4,190,479 A | * | 2/1980 | Smith | 156/294 |
| 4,275,122 A | * | 6/1981 | Fisher | 428/542.8 |
| 4,415,387 A | * | 11/1983 | Newman | 156/29 |
| 4,421,497 A | * | 12/1983 | Federmann et al. | 464/181 |
| 4,820,288 A | | 4/1989 | Isono | |
| 4,932,924 A | * | 6/1990 | Lobel | 464/181 |
| RE33,322 E | * | 9/1990 | Sills et al. | 464/162 |
| 5,087,147 A | * | 2/1992 | Petrzelka et al. | 403/268 |
| 5,309,620 A | * | 5/1994 | Shinohara et al. | 29/432 |
| 5,553,964 A | * | 9/1996 | Rouillot | 403/279 |
| 5,632,685 A | * | 5/1997 | Myers | 464/183 |
| 5,813,794 A | * | 9/1998 | Castellon | 403/359.5 |
| 5,946,977 A | * | 9/1999 | Sato et al. | 74/492 |
| 6,129,477 A | | 10/2000 | Shoykhet | |
| 6,186,697 B1 | * | 2/2001 | Masuda et al. | 403/359.5 |
| 6,190,263 B1 | * | 2/2001 | Kimoto et al. | 464/181 |
| 6,551,009 B1 | * | 4/2003 | Bentley | 403/359.1 |
| 2002/0173363 A1 | * | 11/2002 | Makino et al. | |

FOREIGN PATENT DOCUMENTS

| | | | | |
|---|---|---|---|---|
| DE | 1965382 A | * | 7/1971 | |
| GB | 2127938 A | * | 4/1984 | |
| GB | 2258899 A | * | 2/1993 | |
| JP | 2001-65538 | | 3/2001 | |

OTHER PUBLICATIONS

Office Action, Oct. 14, 2005, Appl. No. 11/041,968.
Notice of Allowance, Feb. 1, 2006, Appl. No. 11/041,968.

* cited by examiner

*Primary Examiner*—James R. Brittain
(74) *Attorney, Agent, or Firm*—Foley & Lardner LLP

(57) ABSTRACT

A joint structure for a power transmitting member comprising a fiber rein forced plastic tube, a joint comprising a joint portion for joining to an end portion of the tube, and a sealing portion formed on an end of the tube side of the joint portion, wherein the joint portion and the sealing portion are disposed in an interior of the tube, a liquid packing compound for sealing between the tube and the joint, wherein the liquid packing compound fills at least an area between the sealing portion and the tube, wherein the sealing portion has a tapered surface, whose diameter increases toward the end of the tube. Thereby, when the joint portion is joined to the end of the tube, a clearance between the tube and the joint portion is entirely filled with the liquid packing compound.

18 Claims, 6 Drawing Sheets

JOINT STRUCTURE FOR POWER TRANSMITTING MEMBER AND METHOD FOR PRODUCING THE SAME

BACKGROUND OF THE INVENTION

1. Field of the Invention

This invention relates to a joint structure for power transmitting member and a method for producing the joint structure for power transmitting member. More particularly, the present invention relates to a joint structure for propeller shaft for vehicle and method for producing the joint structure for propeller shaft for vehicle.

2. Description of the Related Art

It is known that there is a great demand for weight reduction in many fields, especially automobiles, from the viewpoint of fuel economy, environmental protection, etc. As a means for achieving this, use of propeller shafts formed of FRP (fiber-reinforced plastics) is being considered, and some of such propeller shafts have already been put into practical use. Such a propeller shaft has a tube that is made of FRP, and a metal joint that is joined to the end of the tube.

One example of a power transmitting member is the propeller shaft for a vehicle. The propeller shaft for a vehicle is disclosed in, for example, Japan Patent Publication (kou-kai) No. 2001-65538 (incorporated herein by reference). According to that publication, as shown in FIG. 11 of the pre-grant application, the propeller shaft includes an FRP tube 1 and universal joints 2, 3 which are joined to both ends 1a, 1b of the tube 1. A transmission torque generated from an engine (not shown) is transmitted to the following elements in order: a transmission (not shown), the universal joint 2, the tube 1, the universal joint 3, a differential gear (not shown), and a rear wheel (not shown).

The tube 1 comprises a main layer 1c and sub layers 4, 4. The main layer Ic has reinforcing fibers helically wound extending over the length thereof. The sub layers 4, 4 are formed at the ends of the main layer 1c so as to be integral with and internal to the main layer 1c and including hooped reinforcing fibers. The universal joints 2, 3 comprise input axis yokes 5, 5 and output axis yokes 6, 6. Each of the input axis yoke and the output axis yoke are joined together at yoke portions 7, 7. The output axis yokes have fitting portions 8, 8. Each of the fitting portions 8, 8 is joined to the ends 1a, 1b of the tube 1 by press fitting.

As shown in FIGS. 9 and 10 of the pre-grant application, the fitting portion 8 has a sealing portion 8a, a flange portion 9, and a joint portion 10. The sealing portion 8a has a uniform outer diameter. The flange portion 9 is integrally molded with the fitting portion 8. When a load that is bigger than the prescribed value in an axial direction to the axis of the propeller shaft, is applied to the propeller shaft, the flange portion 9 causes the main layer 1c and the sub layer 4 to be separated from each other. This enables an energy absorbing effect to be realized due to the crashable body structure. The joint portion 10 has a serration surface. When the fitting portion 8 is joined to the end of the tube 1 by press fitting, a fastening structure between the tube 1 and the fitting portion 8 is obtained by engaging of the serration surface of the joint portion 10.

Next, a way to join each of the ends 1a, 1b and the fitting portions 8, 8 as shown in FIG. 11 will be described. As shown in FIGS. 9 and 10, first, a liquid packing compound 11 is applied to an edge of the joint portion 10, so as to surround the joint portion 10. Then, the tube 1 is forced into the joint portion 10 of the fitting portion 8 with press fitting until an end surface of the tube 1 almost strikes the flange portion 9. Thereby, the fastening structure between the tube 1 and the fitting portion 8 is obtained with press fitting. In addition, clearances between an inside of the tube 1 and an outer surface of the fitting portion 8, and between the end surface of the tube 1 and the flange portion 9 are filled with the liquid packing compound 11. In effect, the clearances are sealed by the liquid packing compound 11.

When the fitting portion 8 is joined to the end of the tube 1, the liquid packing compound 11 is spread between the inside of the tube 1 and the outer surface of the fitting portion 8. The liquid packing compound 11 is extended into the flange portion 9. However, in this structure for the power transmitting member, the sealing portion 8a has a uniform outer diameter, and the tube 1 has a uniform inner diameter, i.e., a clearance between the outer surface of the sealing portion 8a and the inside of the tube 1 has a uniform width in an axial direction of the axis of the tube 1. Therefore, a pressure force, which acts between the inside of the tube 1 and the outer surface of the fitting portion 8, is averaged around the edge of the inside of the tube 1. As a result, it is hard to fill to a corner 12, which defined between the flange portion 9 and the sealing portion 8a, entirely with the liquid packing compound 11.

Therefore, a failed portion C, in which the liquid packing compound does not adequately fill, may appear. In this case, airtightness between the tube 1 and fitting portion 8 by the liquid packing compound can not be retained. The airtightness degrades with the passage of time. As a result, the tube 1 and the fitting portion 8 may be separated from each other by exfoliation, i.e., the performance of the seal between the tube 1 and the fitting portion 8 may degrade.

SUMMARY OF THE INVENTION

According to an embodiment of the present invention an improved joint structure for a power transmitting member is provided. The joint structure includes a fiber reinforced plastic tube, a joint comprising a joint portion for joining to an end portion of the tube, and a sealing portion formed on an end of the tube side of the joint portion, wherein the joint portion and the sealing portion are disposed in an interior of the tube, a liquid packing compound for sealing between the tube and the joint, wherein the liquid packing compound fills at least an area between the sealing portion and the tube wherein the sealing portion has a tapered surface, whose diameter increases toward the end of the tube.

In another embodiment, the joint structure may include a fiber reinforced plastic tube, a joint comprising a joint portion for joining to an end portion of the tube, and a sealing portion formed on an end of the tube side of the joint portion, wherein the joint portion and the sealing portion are disposed in an interior of the tube, an adhesive for sealing and joining between the tube and the joint, wherein the adhesive fills at least an area between the sealing portion and the tune, wherein the sealing portion has a tapered surface whose diameter increases toward the end of the tube.

According to another aspect of the present invention, a method for producing a joint structure for a power transmitting member is provided. The method includes providing a fiber reinforced plastic tube and a joint comprising a joint portion for joining to an end portion of the tube and a sealing portion formed on the same axis of the joint portion, wherein the sealing portion has a tapered surface whose diameter increases from the joint portion side, applying an amount of a liquid packing compound for sealing at least between the tube and the sealing portion, inserting the joint from the joint portion side into the tube until at least the sealing portion is inserted in the tube, whereby the joint and the tube are joined by press fitting.

It is to be understood that both the foregoing general description and the following detailed description are exemplary and explanatory only, and are not restrictive of the invention as claimed.

BRIEF DESCRIPTION OF THE DRAWINGS

These and other features, aspects and advantages of the present invention will become apparent from the following description, appended claims, and the accompanying exemplary embodiments shown in the drawings, which are briefly described below.

DETAILED DESCRIPTION

Figure 1:
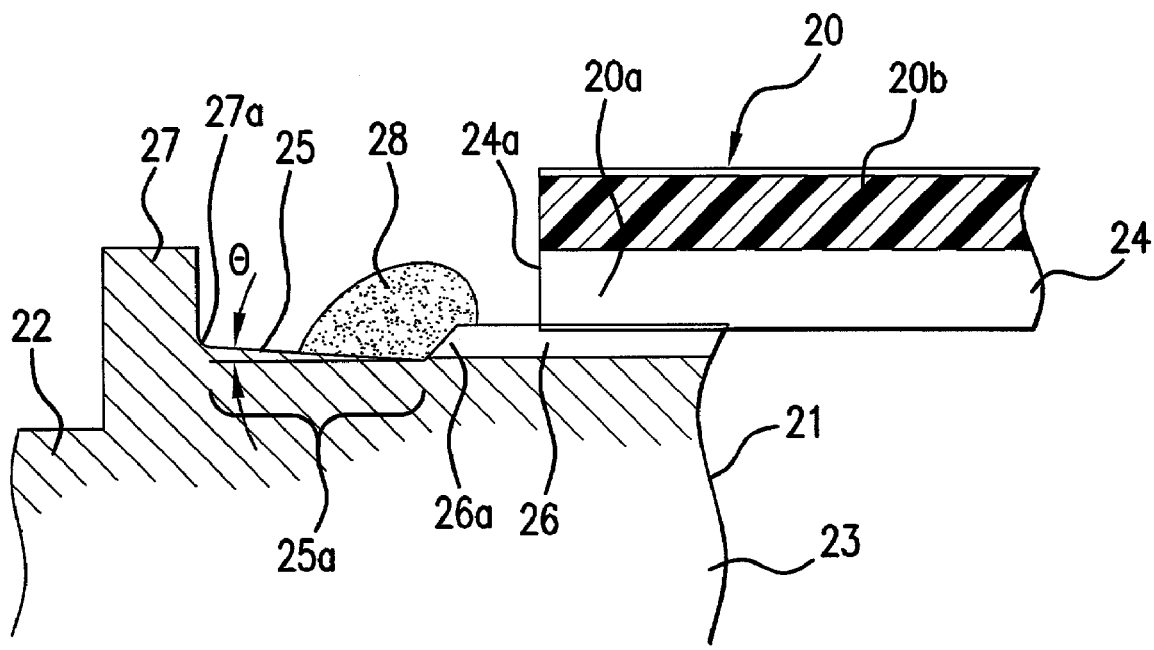
FIG. 1 is an enlarged sectional view of a joint structure for a power transmitting member before the joining of a tube 20 and a fitting portion 23 according to a first embodiment of the present invention.
Figure 2:
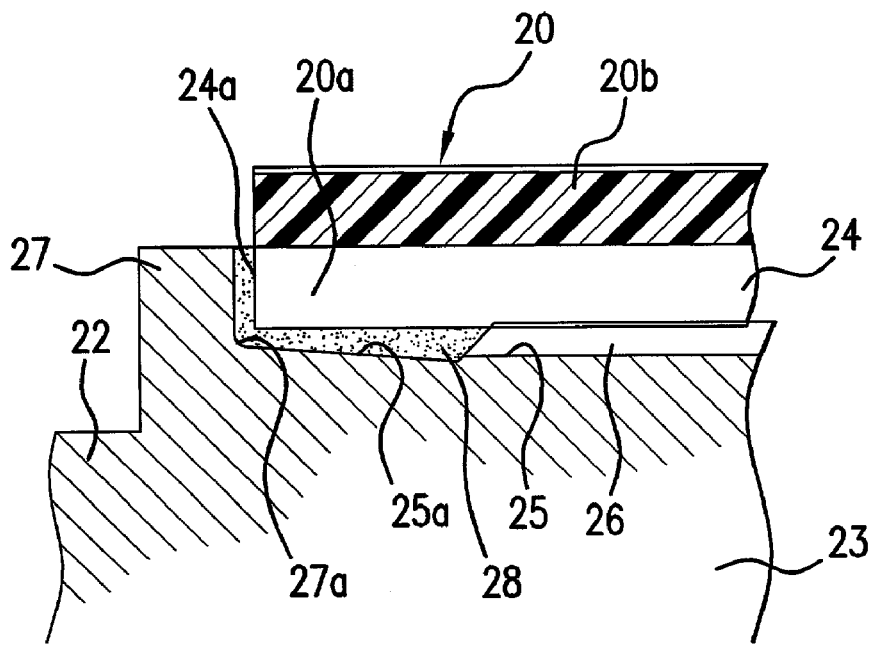
FIG. 2 is an enlarged sectional view of a joint structure for a power transmitting member after the joining of the tube 20 and the fitting portion 23 according to the first embodiment of the present invention.

A joint structure for a power transmitting member according to preferred embodiments will now be described with reference to the drawings. FIGS. 1 and 2 show a first embodiment of the present invention. In this first embodiment, the joint structure is applied for a transmitting member of the propeller shaft of the vehicle. As shown in FIG. 1, the joint structure comprises a tube 20 made of carbon fiber-reinforced plastic (CFRP) and an output axis yoke 21 having a yoke portion 22 and a fitting portion 23. The yoke portion 22 is joined to an input axis yoke (not shown). The fitting portion 23 has a tube shape, and that is joined to the end of the tube 20 by press fitting.

The tube 20 has a main layer 20b and a sub layer 24. The main layer 20b has a uniform inner diameter. The tube 20 is formed by helically winding a bundle of carbon fibers impregnated with an epoxy resin. The sub layer 24 is provided at least at an inner end portion of the main layer 20b. The sub layer 24 is formed by circumferentially winding a bundle of carbon fibers impregnated with the epoxy resin.

The fitting portion 23 has a joint portion 26 and a flange portion 27 on an outer surface of the fitting portion 23. The joint portion 26 has a serration surface. When the fitting portion 23 is joined to the end of the tube 20 by press fitting, a fastening structure between the tube 20 and the fitting portion 23 is obtained by engaging of the serration surface of the joint portion 26. The flange portion 27 is integrally molded with the fitting portion 23. When a load that is bigger than the prescribed value in an axial direction to the axis of the propeller shaft, is applied to the propeller shaft the flange portion 27 causes the main layer 20b and the sub layer 24 to be separated from each other. In this way, the propeller shaft of the vehicle can be provided which is capable of absorbing the load upon collision of the vehicle.

The fitting portion 23 has a sealing portion 25a formed between an end portion 26a of the joint portion 26 and the flange portion 27. The sealing portion 25a has a tapered surface whose diameter increases from the end portion 26a to the corner 27a. The tapered surface is formed at an angle θ of about 10 degrees from the axis of the tube 20. The diameter of the sealing portion 25a is largest at the corner 27a. The largest diameter of the sealing portion 25a is almost the same as the inner diameter of the tube 20, (i.e., the inner diameter of the sub layer 24).

The liquid packing compound 28 is filled between the inside of an end portion 20a of the sub layer 24 and the outer surface 25 of the fitting portion 23.

According to this embodiment, as shown in FIG. 1, first, the liquid packing compound 28 is applied in a loop around the end portion 26a. Then, the tube 20 is pushed into the output axis yoke 21 with press fitting between the end portion 20a of the sub layer 24 and the serration surface of the joint portion 26.

The end surface 24a of the sub layer 24 of the tube 20 spreads the liquid packing compound 28. As a result, the sealing portion 25a is covered by the liquid packing compound 28.

As shown in FIG. 2, the tube 20 is forced into the output axis yoke 21 until the end surface 24a almost strikes the flange portion 27. In this position, the end surface 24a of the sub layer 24 presses the liquid packing compound 28 against the flange portion 27. Furthermore, the end surface 24a strongly presses the liquid packing compound 28 into the corner 27a. Therefore, the liquid packing compound 28 completely fills the entire corner 27a, and an airtightness between the tube 20 and the fitting portion 23 by the liquid packing compound 28 is obtained.

As a result, degradation of the seal performance between the tube 20 and the fitting portion 23 is controlled. This certainly lends long term stability to the airtightness. Specially, as this joint structure is applied for a vehicle (i.e., the tube 20 is the propeller shaft), the entry of the rainwater is prevented. Therefore, the joint portion 26 is protected from rust.

In addition, the liquid packing compound 28 is applied to the entire sealing portion 25a along its tapered surface since the tapered surface is continuously smoothly formed.

Figure 3:
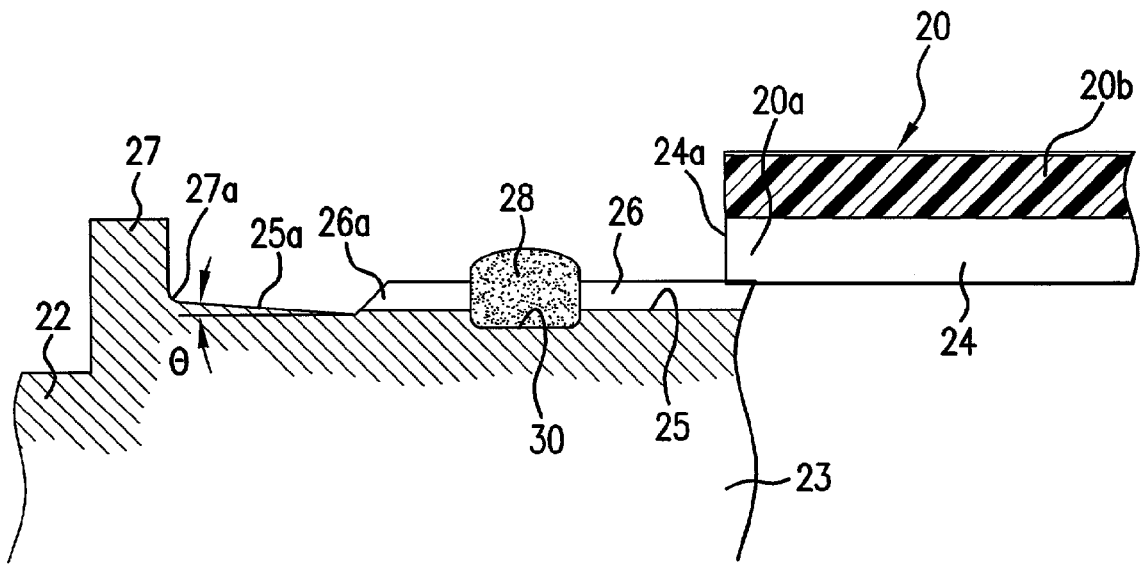
FIG. 3 is an enlarged sectional view of the joint structure for a power transmitting member before the joining of the tube 20 and the fitting portion 23 according to a second embodiment of the present invention.
Figure 4:
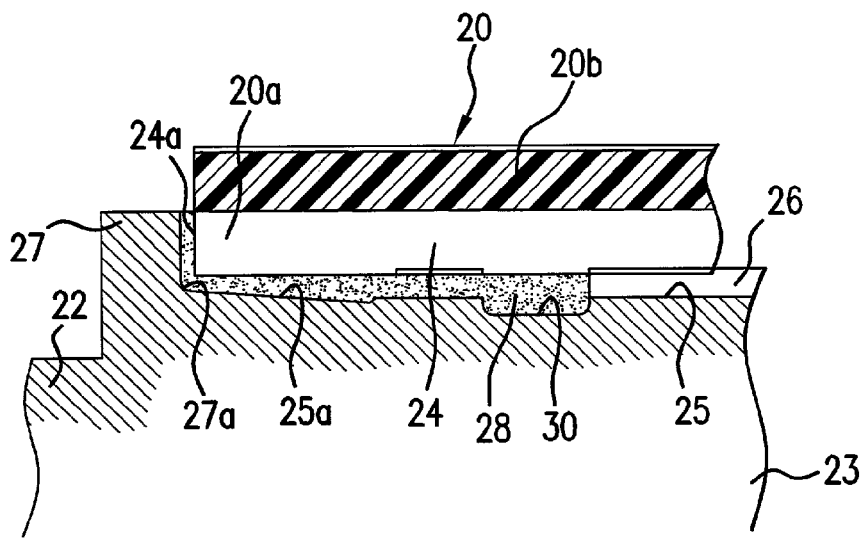
FIG. 4 is an enlarged sectional view of the joint structure for a power transmitting member after the joining of the tube 20 and the fitting portion 23 according to the second embodiment of the present invention.

FIGS. 3 and 4 show a second embodiment of the present invention. In this second embodiment, an annular groove 30 is formed by the end portion 26a of the joint portion 26. The liquid packing compound 28 is held on the annular groove 30 before the joining of the tube 20 and the fitting portion 23. The annular groove 30 is formed in a loop around the fitting portion 23. The depth and the width of the annular groove 30 is set according to an amount of the liquid packing compound 28, which is held on the annular groove 30. The depth of the annular groove 30 is formed deeper than the outer surface 25 and is formed to a prescribed width.

In this embodiment, the same or similar references used to denote elements in the joint structure of the first embodiment (i.e., the tapered surface of the sealing portion 25a etc.) are applied to the corresponding elements used in the second embodiment except the annular groove 30.

Therefore, in this embodiment, it is easy to find out a position in which the liquid packing compound 28 is applied by virtue of the annular groove 30 formed on the fitting portion 23. In addition, an area for sealing is expanded inside of the annular groove 30. This certainly lends long term stability to the seal performance between the tube 20 and the fitting portion 23.

Figure 5:
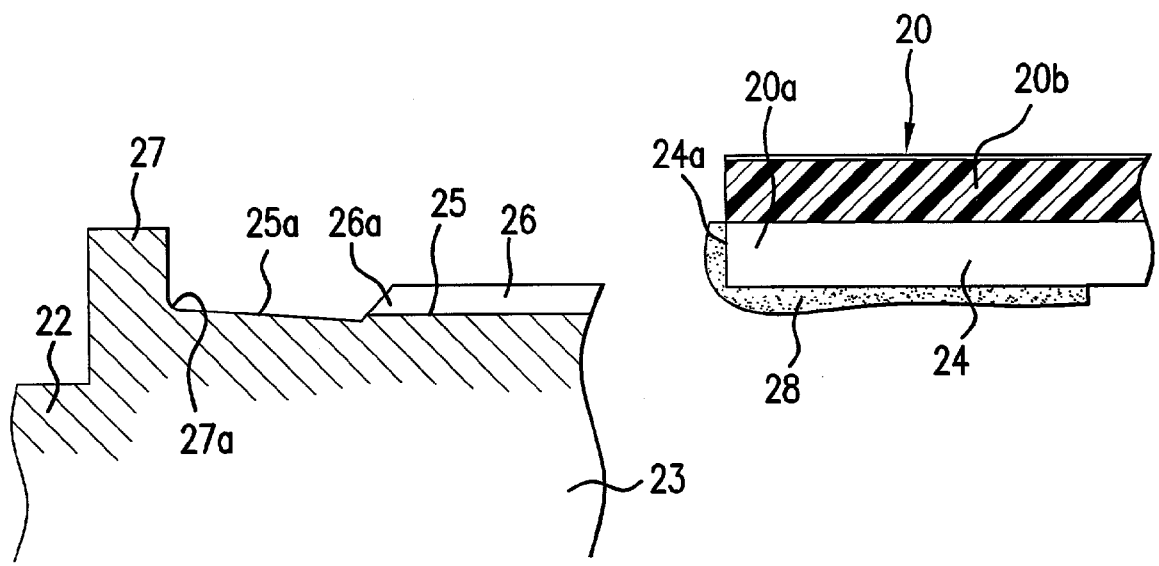
FIG. 5 is an enlarged sectional view of the joint structure for a power transmitting member before the joining of the tube 20 and the fitting portion 23 according to a third embodiment of the present invention.
Figure 6:
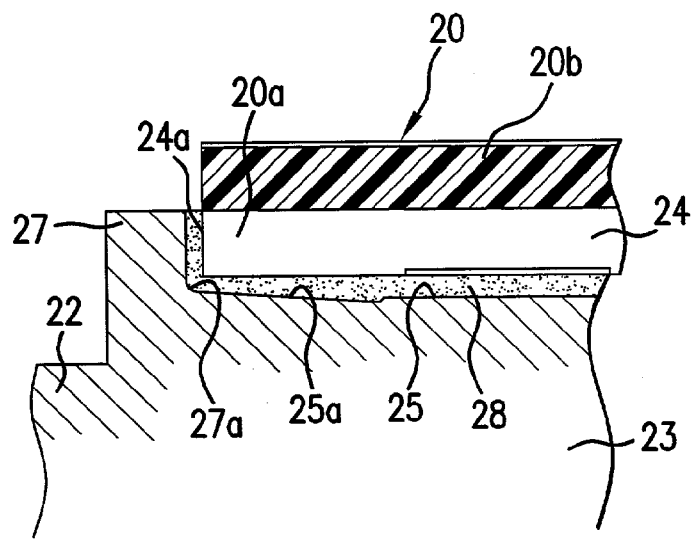
FIG. 6 is an enlarged sectional view of the joint structure for a power transmitting member after the joining of the tube 20 and the fitting portion 23 according to a third embodiment of the present invention.

FIGS. 5 and 6 show a third embodiment of the present invention. In this case, as shown in FIG. 5, the liquid packing compound 28 is applied inside of the end portion 20a of the sub layer 24 and on the end surface 24a of the sub layer 24 other than the fitting portion 23. In this case, as shown in FIG. 6, when the tube 20 is joined into the fitting portion 23, the liquid packing compound 28 fills not only on the sealing portion 25a and flange portion 27, but also between the sub layer 24 and the joint portion 26. Therefore, the area for sealing is further expanded and the seal performance is further improved.

Figure 7:
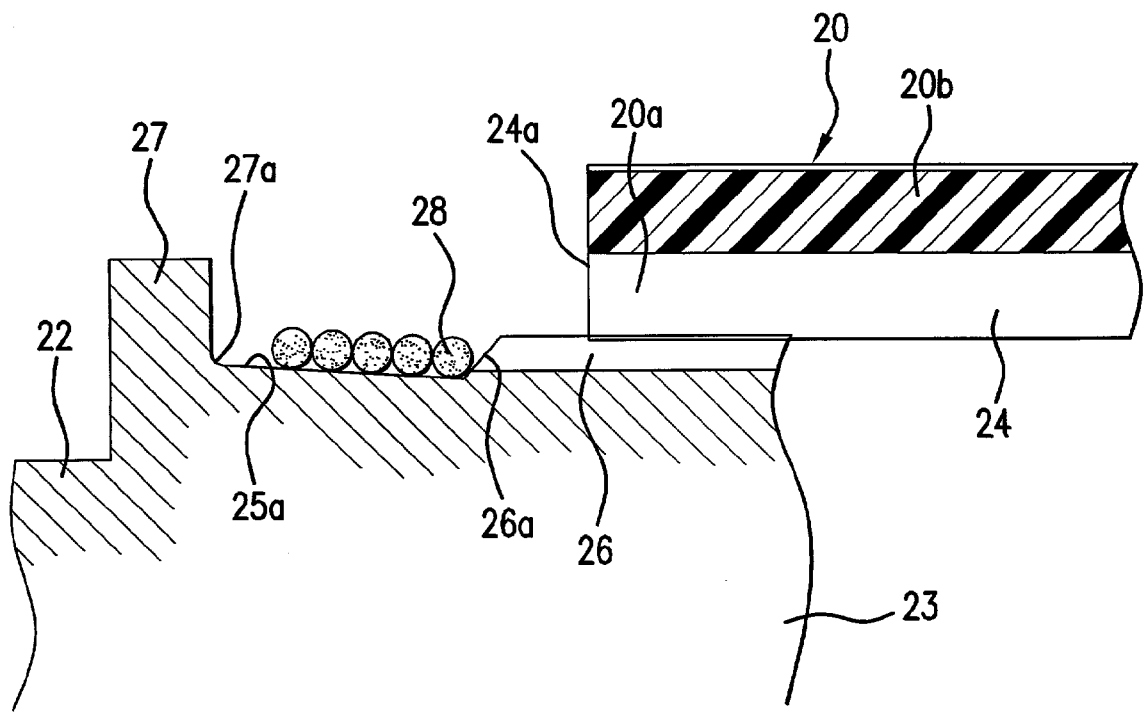
FIG. 7 is an enlarged sectional view of the joint structure for a power transmitting member before the joining of the tube 20 and the fitting portion 23 according to a fourth embodiment of the present invention.
Figure 8:
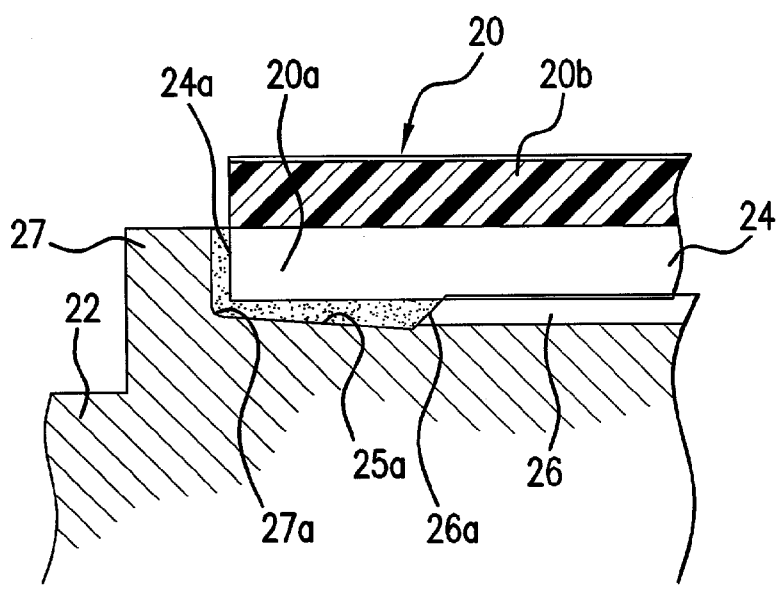
FIG. 8 is an enlarged sectional view of the joint structure for a power transmitting member after the joining of the tube 20 and the fitting portion 23 according to the fourth embodiment of the present invention.
Figure 9:
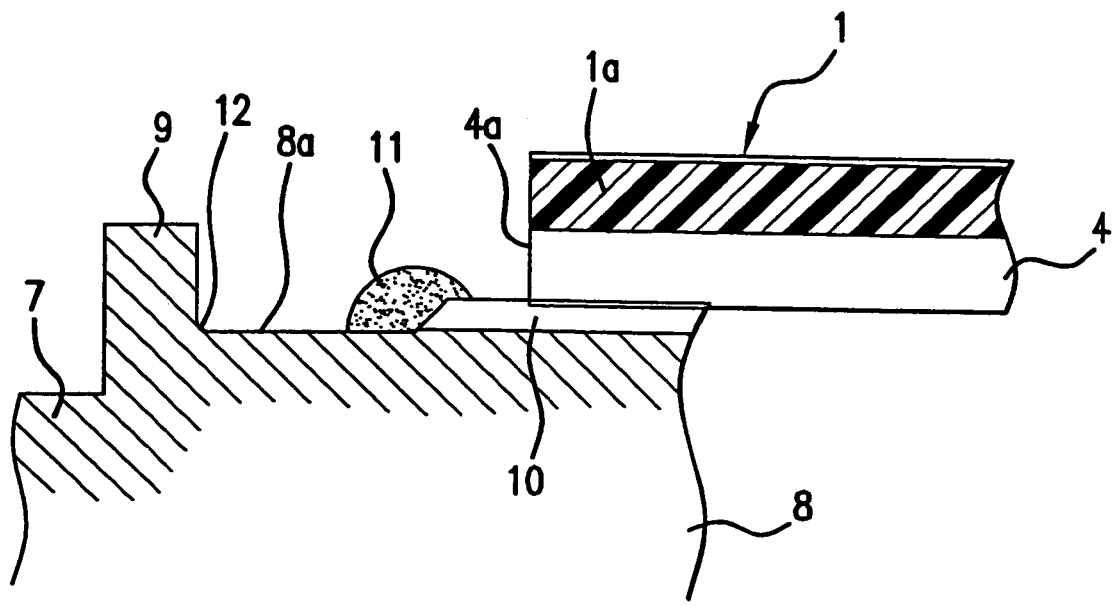
FIG. 9 is an enlarged sectional view of the joint structure for a power transmitting member before the joining of the tube 1 and the fitting portion 8 according to the related art.
Figure 10:
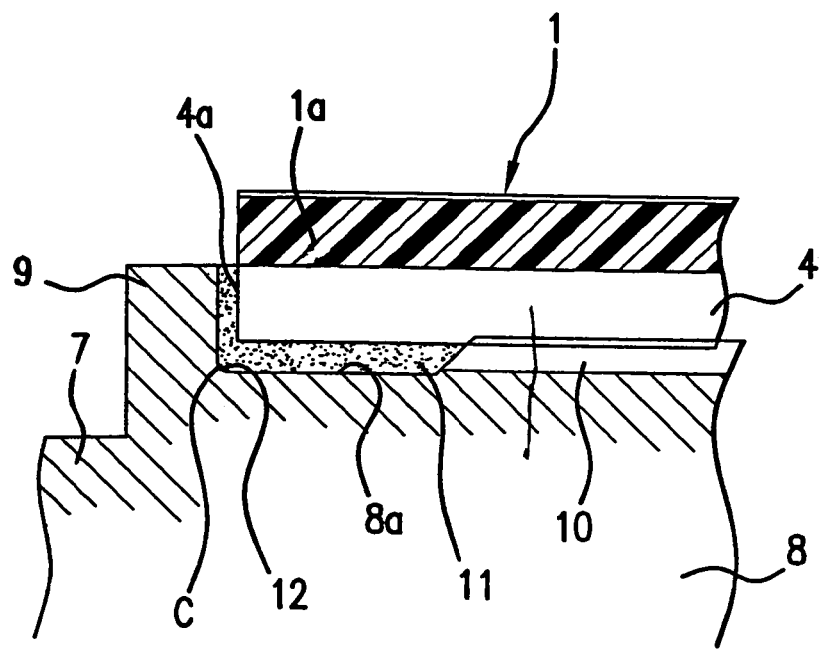
FIG. 10 is an enlarged sectional view of the joint structure for power transmitting member after the joining of the tube 1 and the fitting portion 8 according to the related art.
Figure 11:
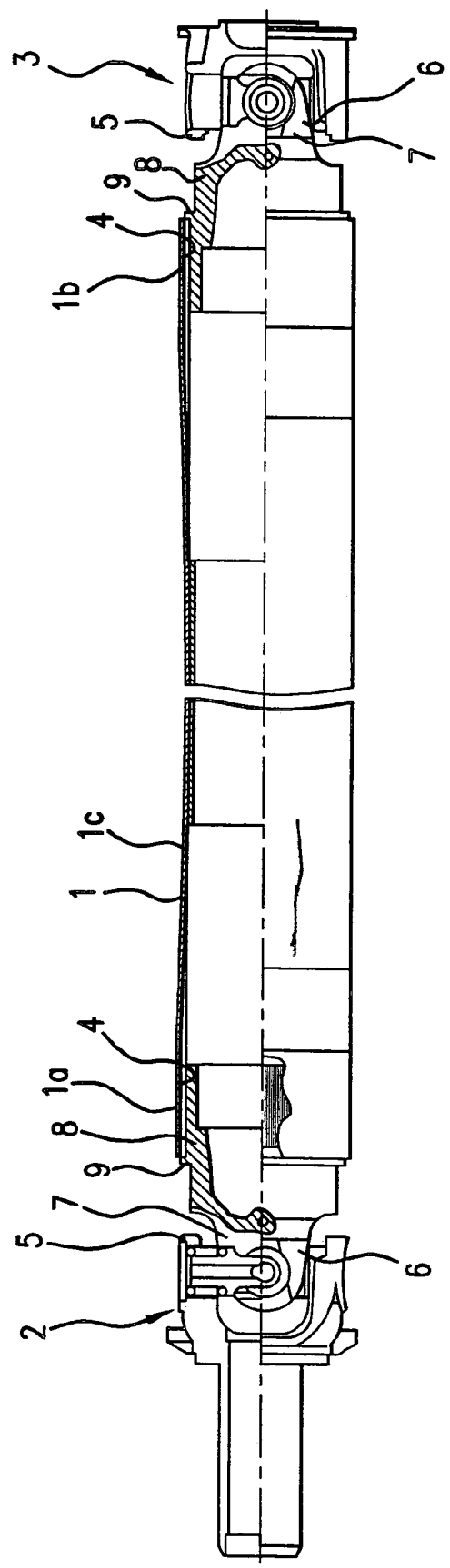
FIG. 11 is a sectional view of the propeller shaft for vehicle according to the related art.

FIGS. 7 and 8 show a fourth embodiment of the present invention. In this case, as shown in FIG. 7, the liquid packing compound 28 has a string shape. The liquid packing compound 28 is wound around the sealing portion 25a from the end portion 26a to the corner 27a. Adjacent hoops of the liquid packing compound 28 are wound to be close together. FIG. 8 shows the transmitting member after the joining of the tube 20 and the fitting portion 23.

According to the fourth embodiment, the liquid packing compound 28 can be easily applied on the sealing portion 25a. This improves the workability of the applying liquid packing compound 28. In addition, the amount of the liquid packing compound 28, which is applied on the sealing portion 25a, can be optimized by choosing the thickness or the number of the hoops of the liquid packing compound 28. This reduces the cost of the materials.

While the present invention is described on the basis of certain preferred embodiment, it is not limited thereto, but is defined by the appended claims as interpreted in accordance with applicable law. For example, according to the previously described preferred embodiments of the present invention, although the tapered surface of the sealing portion 25a is formed at an angle of about 10 degrees from the axis of the tube 20, the angle of the tapered surface can be adjusted according to the specifications covering the tube 20 or the fitting portion 23. Also, although the tube 20 is made of carbon fibers and the epoxy resin, the tube 20 may be made of glass fibers or polyaramid fibers as fibers and unsaturated polyester resin, phenol resin, vinyl ester resin, polyimide resin, polyamide resin, polycarbonate resin or polyether imide resin as the resin. Also, although the tapered surface of the sealing portion 25a is continuously smoothly formed, the pared surface may be formed by a staircase pattern. Also, although the liquid packing compound 28 is filled for sealing between the tube 20 and the sealing portion 25a, an adhesive may be filled for sealing between the tube 20 and the sealing portion 25a. In this case, the joint between the tube 20 and the sealing portion 25a becomes stronger. Also, although the joint portion 26 has a serration surface, the joint portion 26 may have no serration surface. In this case, the reinforcing fibers of the tube 20 are not scratched by the serration surface of the joint portion 26. When the joint portion 26 has no serration surface, the adhesive is preferable to liquid packing compound 28 for sealing between the tube 20 and the fitting portion 23. Also, although the tube 20 is circular in cross section, the tube 20 may have a square cross section or another cross section shape. Also, when the joint portion 23 is joined to the end portion of the tube 20 by press fitting, although in the preferred embodiment, the tube 20 is pushed into the output axis yoke 21, press fitting of the tube 20 and the joint portion 23 maybe accomplished in a number of ways, including where the output axis 21 is pushed into the tube 20, and where the tube 20 and the joint portion 23 are pushed together.

This application relates to and incorporates herein by reference in its entirety Japanese Patent application No. 2001-273320, filed on Sep. 10, 2001, from which priority is claimed.

What is claimed is:

1. A joint structure for a power transmitting member comprising:
    a fiber reinforced plastic tube;
    a joint comprising a joint portion for joining to an end portion of the tube, and a sealing portion formed on an end of the tube side of the joint portion extending circumferentially around the joint, wherein the joint portion and the sealing portion are disposed in an interior of the tube to be in an assembled state and wherein in the assembled state an outer diameter of the joint portion is larger than an inner diameter of the end portion of the tube; and
    a liquid packing compound for sealing between the tube and the joint,
    wherein the liquid packing compound fills at least an area between the sealing portion and the tube, the sealing portion has a tapered surface whose diameter increases toward the end of the tube, a separation distance between the tapered surface and an inner surface of the tube decreases toward the end of the tube, and the tapered surface is continuously formed around the entire sealing portion.

2. A joint structure according to claim 1, wherein the tapered surface is formed at an angle of about 10 degrees from an axis of the tube.

3. A joint structure according to claim 1, wherein the tapered surface has its largest diameter at the end of the sealing portion, wherein the largest diameter of the sealing portion is approximately as large as an inside diameter of the tube.

4. A joint structure according to claim 1, wherein the tube comprises a main layer extending over the entire length of the tube and a sub layer formed at the end portion of the tube so as to be formed integrally with and internally to the main layer.

5. A joint structure according to claim 4, wherein the joint has a flange portion formed on the end of the tube side of the sealing portion, a diameter of the flange portion is larger than an inside diameter of the sub layer, and smaller than an inside diameter of the main layer.

6. A joint structure according to claim 5, wherein liquid packing compound exists between the end portion of the tube and the flange portion.

7. A joint structure according to claim 1, wherein the joint further comprises a portion defining an annular groove on the joint portion.

8. A joint structure according to claim 1, wherein the joint further comprises a serration surface on the joint portion for joining the tube and the joint.

9. A joint structure according to claim 1, wherein the end portion of the tube and the joint are free of liquid packing compound injection holes.

10. A joint structure for a power transmitting member comprising:
   a fiber reinforced plastic tube;
   a joint comprising a joint portion for joining to an end portion of the tube, and a sealing portion formed on an end of the tube side of the joint portion extending circumferentially around the joint, wherein the joint portion and the sealing portion are disposed in an interior of the tube to be in an assembled state and wherein in the assembled state an outer diameter of the joint portion is larger than an inner diameter of the end portion of the tube; and
   an adhesive for sealing between and joining the tube and the joint,
   wherein the adhesive fills at least an area between the sealing portion and the tube, the sealing portion has a tapered surface whose diameter increases toward the end of the tube, a separation distance between the tapered surface and an inner surface of the tube decreases toward the end of the tube, and the tapered surface is continuously formed around the entire sealing portion.

11. A joint structure according to claim 10, wherein the joint has a portion defining an annular groove on the joint portion.

12. A joint structure according to claim 10, wherein the joint has a flat surface on the joint portion, the flat surface is connected into the inside of the tube by press fitting.

13. A joint structure for a power transmitting member comprising:
   a fiber reinforced plastic tube;
   a joint comprising a joint portion for joining to an end portion of the tube, and a sealing portion positioned on an end of the tube side of the joint portion extending circumferentially around the joint, wherein the joint portion and the sealing portion are disposed in an interior of the tube to be in an assembled state and wherein in the assembled state an outer diameter of the joint portion is larger than an inner diameter of the end portion of the tube; and
   a liquid packing compound for sealing between the tube and the joint,
   wherein the liquid packing compound fills at least a volume between the sealing portion and the tube, the sealing portion has a tapered surface whose diameter increases toward the end of the tube, the volume has a cross sectional area that decreases toward the end of the tube, and the tapered surface is continuously formed around the entire sealing portion.

14. A joint structure according to claim 13, wherein the joint h as a serration surface that engages with the tube.

15. A joint structure according to claim 13, wherein the end portion of the tube and the joint are free of liquid packing compound injection holes.

16. A joint structure for a power transmitting member comprising:
   a fiber reinforced plastic tube;
   a joint comprising a joint portion for joining to an end portion of the tube, and a sealing portion positioned on an end of the tube side of the joint portion extending circumferentially around the joint, wherein the joint portion and the sealing portion are disposed in an interior of the tube to be in an assembled state and wherein in the assembled state an outer diameter of the joint portion is larger than an inner diameter of the end portion of the tube; and
   a liquid packing compound for sealing between the tube and the joint,
   wherein the liquid packing compound fills at least an area between the sealing portion and the tube, the sealing portion has a tapered surface whose diameter increases toward the end of the tube, the tube has a substantially constant inner diameter throughout the area between the sealing portion and the tube, and the tapered surface is continuously formed around the entire sealing portion.

17. A joint structure according to claim 16, wherein the joint has a serration surface that engages with the tube.

18. A joint structure according to claim 16, wherein the end portion of the tube and the joint are free of liquid packing compound injection holes.

* * * * *